United States Patent Office 3,253,059
Patented May 24, 1966

3,253,059
HOT MELT ADHESIVE PARTICULARLY SUITED TO AFFIXING LABELS TO THERMOPLASTIC FILM OVERWRAP
Walter K. Vollmer, North Plainfield, N.J., assignor to Union Carbide Corporation, a corporation of New York
No Drawing. Filed Mar. 1, 1961, Ser. No. 92,440
6 Claims. (Cl. 260—897)

This invention relates to hot melt adhesive for bonding together cellulosic sheet material and organic thermoplastic film substrates. More particularly, the invention relates to hot melt adhesives exhibiting particularly good bonding action between dissimilar substrates, e.g. paper and polyethylene film.

Polyethylene film is presently used for protecting a wide variety of goods both as a primary wrapping material and as an overwrap. A particular example is the wrapping of bread loaves on high speed wrapping machinery. It is usual to affix a label to the ends of the wrapped bread loaf for product identification. The label also reinforces the end seal of the wrapper.

To affix the label, which normally is sheet material of a cellulosic nature, e.g. paper, to the polyethylene film, it is necessary to employ an adhesive exhibiting good adhesion to both types of materials. Solvent containing adhesive compositions are not desirable because of their slow evaporation which makes the time needed to make the label adhere firmly too long for high speed wrapping equipment. Also, solvents may impart an undesirable odor or taste to the packaged article. Polyethylene applied alone as a hot melt is not a good adhesive because of poor bonding to cellulosic substrates and because it has a very brief tacky period, which necessitates critically rapid affixing of the label to the wrapping.

It is an object therefore of the present invention to provide a hot melt adhesive which is solvent free and has a commercially useful tacky period.

It is another object to provide a hot melt adhesive which can be independently applied to one of the substrates to be bonded and thereafter heat activated to a usefully long tacky condition just prior to bonding.

It is another and highly specific object to provide a hot melt adhesive for bonding cellulosic labels to polyethylene film which adhesive (1) exhibits desirable blocking characteristics and hence is adaptable to high speed machinery, (2) has a usefully long tacky period and (3) develops strong adhesion to both cellulosic and polyethylenic substrates.

It has now been discoverd that these and other objects of the present invention are achieved by employing a hot melt adhesive containing at least three thermoplastic resins, the resins comprising per 100 parts by weight from 50 to 95 parts by weight of a mixture of ethylene homopolymer and a copolymer of ethylene and ethyl acrylate in a ratio of homopolymer to copolymer of from 0.5:1 to 6:1 and from 5 to 50 parts by weight of a terpene resin.

The above composition exhibits good bonding strength, is readily applied and seals quickly. The composition is heat activatable i.e., it can be applied to a substrate, stored and handled without blocking and thereafter heated to a tacky condition which can be maintained for a length of time convenient for automatic sealing and labeling operation.

The ethylene homopolymers in the hot melt adhesive composition of the present invention are the low density and low molecular weight but normally solid ethylene homopolymers well known to the art. Preferred are ethylene homopolymers having a density of less than about 0.91 and particularly between about 0.8 and 0.90, a molecular weight below about 15,000 and particularly between about 12,000 and 2,000 and below as measured by the solution viscosity method described by Rugg, Smith and Wartman in J. Polymer Sci., XI 1–20 (July 1953) and a melt index above about 200 and particularly above 1000 as measured according to ASTM D–1238–57T. There is thus included as the ethylene homopolymer component the low melting solids of wax-like consistency. Blends of two or more ethylene homopolymers can be used to effect various combinations of bond strength and melt viscosity.

Typical of useful ethylene homopolymers are:

(1) A polyethylene which has a density of about 0.91, a molecular weight of 12,000 and a melt index of about 250–500;

(2) A polyethylene which has a density of about 0.90, a molecular weight of 7000 and a melt index of about 1000; and (3) A polyethylene which has a density of about 0.89, a molecular weight of 4000 and a melt index of more than 5000.

The ethylene/ethyl acrylate copolymers in the hot melt adhesive composition of the present invention are the normally solid copolymers of ethylene and ethyl acrylate containing from 5 to 20% by weight combined ethyl acrylate. Preferred are those having a melt index of from about 5 to about 30 and especially between 5 and 15 for optimum melt viscosity. Easier and faster bonding is obtained using copolymers containing less than maximum combined ethyl acrylate content, e.g. about 15% by weight and below. A copolymer of 90% ethylene/10% ethyl acrylate by weight is preferred for use in automatic packaging machinery since it provides the combination of temperature, pressure and dwell time needed to effect a good seal in this type of operation.

Typical ethylene/ethyl acrylate copolymers are:

A copolymer which contains 20% combined ethyl acrylate by weight and has a melt index of 5.5;

A copolymer which contains 15% combined ethyl acrylate by weight and has a melt index of 5.0;

A copolymer which contains 10% combined ethyl acrylate by weight and has a melt index of 22 to 28 and, A copolymer which also contains 10% combined ethyl acrylate by weight but which has a melt index of 10 to 14.

The terpene resins in the hot melt adhesive composition of the present invention are thermoplastic polyterpene resins comprising principally polymerized beta pinene (nopinene). These resins have the general formula $(C_{10}H_{16})_n$ wherein $n$ is an integer such that the polymers have melting points as indicated by the ball and ring softening point method of from 10 to 135° C., measured according to ASTM E28–51T. They are available commercially and are usually produced by the polymerization in solution using a Friedel-Crafts catalyst of the bicyclic monoterpene beta pinene, $C_{10}H_{16}$. The terpene resins generally have densities of from about 0.97 to 1.0 and range in molecular weight up to about 1200. Typical of these terpene resins are the following;

Piccolyte S–10 which has a melting point of 10° C.
Piccolyte S–25 which has a melting point of 25° C.
Piccolyte S–40 which has a melting point of 40° C.
Piccolyte S–55 which has a melting point of 55° C.
Piccolyte S–70 which has a melting point of 70° C.
Piccolyte S–85 which has a melting point of 85° C.
Piccolyte S–100 which has a melting point of 100° C.
Piccolyte S–115 which has a melting point of 115° C.
Piccolyte S–125 which has a melting point of 125° C. and
Piccolyte S–135 which has a melting point of 135° C.

To prepare the hot melt adhesive composition of this invention the particular amount of terpene resin to be used, from 5 to 50 parts by weight, is determined based primarily on the degree of adhesion to the cellulosic substrate desired. Greater amount generally provides greater adhesion. Amounts of from 10 to 30 parts by weight provides the best balance of paper and film adhesiveness. Then the remainder of the composition 50 to 95 parts by weight or preferably 70 to 90 parts by weight, is made up of ethylene homopolymer and ethylene/ethyl acrylate copolymer. It is essential to obtain the bonding properties herein described to employ the homopolymer and copolymer in a ratio of from 0.5:1 to 6:1 of the former to the latter. Ratios of from 1:1 to 4:1 are preferred for affixing labels in automatic machinery because there good early tackiness, quick adhesion and slight pressure are needed to effect a good seal. For optimum bonding performance a ratio of about 2:1 of homopolymer to copolymer is particularly desirable.

The components are heated and mixed together to a homogeneous mass in any suitable equipment.

As with other adhesive compositions numerous additives can be incorporated in the composition of this invention, for example, anti-blocking agents, particularly the amides of long chain fatty acids e.g. of oleic, erucic, stearic and palmitic acids, slip agents and other modifiers. The composition should be kept solvent-free and used as a hot melt.

The composition is applied to one or both of the surfaces to be joined by any convenient means, e.g. wiping, spotting, drawdown rod etc. Suitable substrates include: cellulosic products such as paper and cellophane; metal foil including aluminum and tin foil; and synthetic thermoplastic films such as those of polymers and copolymers of olefinically unsaturated hydrocarbons e.g. ethylene, propylene, 1-butene and compounds containing the —CH=CH$_2$ group e.g. vinyl chloride and styrene.

The following examples are illustrative of the present invention. All parts, ratios and percentages are by weight unless otherwise stated.

In each of the examples the components were heated together at 350–400° F. until a fluid, homogeneous hot melt was obtained. The hot melt was smoothed on 37 pound label stock to a thickness of 1.0–1.5 mils with a wire wound rod. To measure adhesion to polyethylene the adhesive coated label stock was cut into three inch squares and a 1.5 mil thick polyethylene film was placed on the coated side. The label was placed, uncoated side down, on a hot plate set at 200° F. and pressed down with a hard asbestos board measuring two inches square and weighing about two ounces. Dwell time was three seconds for each sealing.

Quality of adhesion was measured by pulling the polyethylene film from the label by hand. Adhesion was rated "very good" where the paper tore before delamination and from "good" to "fair" to "poor" depending on the quantity of force necessary to delaminate the seal.

Variation in polyethylenes and ethyl acrylates used and in the relative amounts of polyethylene, ethyl acrylate and terpene resin are illustrated by the examples as indicated in the table.

*Examples 1–16*

TABLE

[Parts by Weight]

| Components | Control | 1 | 2 | 3 | 4 | 5 | 6 | 7 |
|---|---|---|---|---|---|---|---|---|
| Polyethylene: | | | | | | | | |
| (A) Density, 0.89; M.W., 4,000; M.I., >5,000 | 67 | 63.3 | 60 | 50 | 40 | 36.7 | 50 | 37.5 |
| (B) Density, 0.911; M.W., 12,000; M.I., 250–300 | | | | | | | | |
| Ethylene/Ethyl Acrylate: | | | | | | | | |
| (A) 10% ethylacrylate, M.I. 10–14 | 33 | 31.7 | 30 | 25 | 20 | 18.3 | | 37.5 |
| (B) 15% ethylacrylate, M.I. 5.0 | | | | | | | 25 | |
| Terpene Resin | 0 | 5 | 10 | 25 | 40 | 45 | 25 | 25 |
| Oleamide | 1.0 | 1.0 | | 1.0 | | 1.0 | 1.0 | 1.0 |
| Stearamide/palmitamide blend | | | 0.5 | | 0.5 | | | |
| Polyethylene/Ethylene Ethyl Acrylate Ratio | 2/1 | 2/1 | 2/1 | 2/1 | 2/1 | 2/1 | 2/1 | 1/1 |
| Bond Strength | Poor[1] | Fair[2] | Very Good | Very Good[4] | Good[3] | Good | Good | Very Good |

| Components | 8 | 9 | 10 | 11 | 12 | 13 | 14 | 15 | 16 |
|---|---|---|---|---|---|---|---|---|---|
| Polyethylene: | | | | | | | | | |
| (A) Density, 0.89; M.W., 4,000; M.I., >5,000 | 72 | 64.3 | 25 | | 30 | 15 | | 20 | 30 |
| (B) Density, 0.911; M.W., 12,000; M.I., 250–300 | | | | 60 | 30 | 45 | 40 | 20 | 10 |
| Ethylene/Ethyl Acrylate: | | | | | | | | | |
| (A) 10% ethylacrylate, M.I. 10–14 | 18 | 10.7 | 50 | 30 | 30 | 30 | 20 | 20 | 20 |
| (B) 15% ethylacrylate, M.I. 5.0 | | | | | | | | | |
| Terpene Resin | 10 | 25 | 25 | 10 | 10 | 10 | 40 | 40 | 40 |
| Oleamide | | 1.0 | 1.0 | | | | | | |
| Stearamide/palmitamide blend | 0.5 | | | 0.5 | 0.5 | 0.5 | 0.5 | 0.5 | 0.5 |
| Polyethylene/Ethylene Ethyl Acrylate Ratio | 4/1 | 6/1 | 0.5/1 | 2/1 | 2/1 | 2/1 | 2/1 | 2/1 | 2/1 |
| Bond Strength | Good | Fair[5] | Good | Good | Very Good | Good | Fair | Very Good | Fair |

[1] Readily peeled apart with little or no resistance.
[2] Resisted being pulled apart.
[3] Greatly resisted being pulled apart.
[4] Paper tore before bond could be disrupted.
[5] Coating to Paper Failure.

It will be noted from a consideration of the table that in the absence of a terpene resin the cellulosic label-to-polyethylene film bond is "poor" (control). The use of as little as 5 parts terpene resin, however, upgrades the adhesive to a "fair" rating. Amounts of terpene resin in the preferred range, 10–30, where the ratio of ethylene homopolymer to copolymer is 4/1 or less (Examples 2, 3, 6, 7, 8, 10, 12, and 13) provided adhesives receiving a "very good" or "good" rating. Use of more than 30 parts terpene resin also provides useful adhesives as indicated by Examples 4, 14, 15, 16, (40 parts) and 5 (45 parts).

Ethylene/ethyl acrylate copolymers containing 10% copolymerized ethyl acrylate (Example 3) provide results superior to those obtained with higher combined ethyl acrylate content copolymers e.g. 15% (Example 6) but both types of composition are highly useful as adhesives.

Examples 2, 3, 7, 12 and 15 demonstrate that: ratios of polyethylene to ethylene-ethyl acrylate copolymer can be varied from 0.5:1 to 6:1 with good adhesive-to-polyethylene bonding, above a ratio of about 4:1 of the ethylene polymers the bond strength between the adhesive and the paper is affected, and that ratios of 2:1 are highly effective.

Mixtures of high and low molecular weight polyethylenes (Examples 12, 13, 15 and 16) provide equivalent or superior bonding performance to single polyethylene resin adhesives.

What is claimed is:

1. A solvent-free adhesive composition adapted to be applied as a hot-melt containing three thermoplastic resins, said resins comprising per 100 parts by weight based on the sum of the three resins from 50 to 95 parts by weight of a mixture of low density, low molecular weight normally solid ethylene homopolymer and a normally solid copolymer of ethylene and ethyl acrylate containing from 5 to 20% by weight combined ethyl acrylate in a homopolymer:copolymer ratio of from 0.5:1 to 6:1 and from 5 to 50 parts by weight of a terpene resin having the general formula $(C_{10}H_{16})_n$ where $n$ is an integer such as will provide a ball and ring softening point of from 10° C. to 135° C.

2. A solvent-free adhesive composition adapted to be applied as a hot melt containing three thermoplastic resins, said resins comprising per 100 parts by weight based on the sum of the three resins from 50 to 95 parts by weight of a mixture of a normally solid ethylene homopolymer having a density of less than about 0.913, a molecular weight of less than 15,000 and a melt index above about 200 and a normally solid copolymer of ethylene and ethyl acrylate containing from 5 to 20% by weight combined ethyl acrylate and having a melt index of from about 5 to about 30 in a homopolymer:copolymer ratio of from 0.5:1 to 6:1 and from 5 to 50 parts by weight of a terpene resin having the general formula $(C_{10}H_{16})_n$ where $n$ is an integer such as will provide a ball and ring softening point of from 10° C. to 135° C.

3. A solvent-free adhesive composition adapted to be applied as a hot melt containing three thermoplastic resins, said resins comprising per 100 parts by weight based on the sum of the three resins from 55 to 90 parts by weight of a mixture of a normally solid ethylene homopolymer having a density of less than about 0.913, a molecular weight of less than 15,000 and a melt index above about 200 and a normally solid copolymer of ethylene and ethyl acrylate containing from 5 to 20% by weight combined ethyl acrylate and having a melt index of from about 5 to about 30 in a homopolymer:copolymer ratio of from 0.5:1 to 6:1 and from 10 to 45 parts by weight of a terpene resin having the general formula $(C_{10}H_{16})_n$ where $n$ is an integer such as will provide a ball and ring softening point of from 10° C. to 135° C.

4. A solvent-free adhesive composition adapted to be applied as a hot melt containing three thermoplastic resins, said resins comprising per 100 parts by weight based on the sum of the three resins from 70 to 90 parts by weight of a mixture of a normally solid ethylene homopolymer having a density of from 0.8 to 0.91, a molecular weight of from 2,000 to 12,000, and a melt index above 1000 and a normally solid copolymer of ethylene and ethyl acrylate containing from 10 to 15% combined ethyl acrylate and having a melt index of from 5 to 15 in a homopolymer:copolymer ratio of from 1:1 to 4:1 and from 10 to 30 parts by weight of a terpene resin having the general formula $(C_{10}H_{16})_n$ where $n$ is an integer such as will provide a ball and ring softening point of from 10° C. to 135° C.

5. A solvent-free adhesive composition adapted to be applied as a hot melt containing three thermoplastic resins, said resins comprising per 100 parts by weight based on the sum of the three resins from 70 to 90 parts by weight of a mixture of a normally solid ethylene homopolymer having a density of from 0.89 to 0.91, a molecular weight between 4,000 and 12,000 and a melt index between 250 and about 5,000 and a normally solid copolymer of ethylene and ethyl acrylate containing 10% by weight combined ethyl acrylate and having a melt index of from 5 to 15 in a homopolymer:copolymer ratio of from 2:1 to 4:1 and from 10 to 30 parts by weight of a terpene resin having the general formula $(C_{10}H_{16})_n$ where $n$ is an integer such as will provide a ball and ring softening point of from 10° C. to 135° C.

6. The solvent-free adhesive composition claimed in claim 5 wherein the normally solid ethylene homopolymer content is a blend of ethylene homopolymers having different molecular weights and melt indexes within the range of 4,000 to 12,000 and 250 to about 5,000, respectively.

References Cited by the Examiner

UNITED STATES PATENTS

| | | | |
|---|---|---|---|
| 2,453,644 | 11/1948 | Steinkraus | 260—897 X |
| 2,772,247 | 11/1956 | Schroeder | 260—897 X |
| 2,893,907 | 7/1959 | Bove | 154—50 |
| 2,894,925 | 7/1959 | Morris et al. | 260—896 X |
| 2,897,108 | 7/1959 | Harwood | 154—50 |
| 2,912,398 | 11/1959 | Johnson et al. | 260—897 X |
| 2,953,541 | 9/1960 | Pecha et al. | 260—897 |
| 2,975,150 | 3/1961 | Johnson et al. | 260—897 X |
| 2,983,704 | 5/1961 | Roedel | 260—897 |

WILLIAM H. SHORT, *Primary Examiner.*

C. F. KRAFFT, *Examiner.*